Patented May 23, 1944

2,349,756

UNITED STATES PATENT OFFICE 2,349,756

FORMALDEHYDE RESIN MODIFIED WITH A POLYISO- OR POLYISOTHIOCYANATE

Burt Carlton Pratt, Wilmington, Del., assignor to E. I. du Pont de Nemours & Company, Wilmington, Del., a corporation of Delaware No Drawing. Application July 25, 1940, Serial No. 347,553

19 Claims. (Cl. 260—57)

The invention relates to improved resinous compositions and especially to improved resinous condensation products of formaldehyde with monomeric compounds.

Resinous formaldehyde condensation products such as phenol-formaldehyde and urea-formaldehyde resins have been widely used in molding compositions and in the manufacture of coating compositions, since they possess many valuable properties denied to any other group of substances. However, in certain cases these resinous formaldehyde condensation products require undesirably long baking schedules to attain adequate hardness and they also have inadequate water resistance.

This invention has as an object the provision of a process for increasing the water resistance and decreasing the baking time of resinous condensation products of formaldehyde with monomeric compounds. Another object comprises new coating and molding compositions of improved properties in respect to thermal hardening and water resistance. Other objects will appear hereinafter.

These objects are accomplished by the following invention wherein a resinous condensation product of formaldehyde and at least one monomeric substance reactive therewith to form a resin is reacted with an organic compound having a plurality of —NCA groups, wherein A is a member of the sixth group of elements i. e., a chalcogen having an atomic weight less than 33, i. e., is oxygen or sulfur.

In one of the preferred embodiments of the invention, i. e., when the resinous formaldehyde condensation product is to be used in a coating composition, it is dissolved in a solvent which will not react with the modifier under the conditions of the process (such as an ether, hydrocarbon, chlorinated hydrocarbon, ester, or tertiary amide type solvent, i. e., a solvent free from active hydrogen) and to this solution is added at room temperature a low proportion of a polyisocyanate or polyisothiocyanate, preferably a diisocyanate or diisothiocyanate. A film from this composition either on air-drying or baking has improved water resistance, toughness, and hardness over an unmodified control.

If the resinous formaldehyde condensation product is to be used in a molding composition, it is treated directly with a low proportion of a polyisocyanate or polyisothiocyanate. A molding from this composition has improved thermal hardening and water resistance.

To avoid decomposition of the polyisocyanate or polyisothiocyanate, no appreciable amount of water, alcohol, or other material active with diisocyanates, should be present in the above compositions. It has been found, however, that the commercially available resins falling under the scope of the present invention may be employed without any dehydrating treatment.

The more detailed practice of the invention is illustrated by the following examples, wherein parts given are by weight. There are of course many forms of the invention other than these specific embodiments.

Example I

This example illustrates the modification of a resinous phenolic-formaldehyde condensation product with a diisocyanate and benzoyl peroxide catalyst.

To 100 parts of a p-phenylphenol-formaldehyde resin ("Bakelite XR-254") dissolved in 100 parts of toluene is added 9.6 parts of hexamethylene diisocyanate and 0.1 part of benzoyl peroxide. After mixing thoroughly, a film is flowed and baked for one hour at 100° C. The resulting film has improved hardness and water resistance as compared to a control of the original resin, treated similarly.

A meta-cresol-formaldehyde resin prepared by heating 2 moles of meta-cresol and 3 moles of formaldehyde in the presence of sodium hydroxide as a catalyst and stopping the reaction just before the resin becomes insoluble in alcohol gives similar results when treated with hexamethylene diisocyanate.

Example II

This example illustrates the effect of a diisocyanate on a moldable phenolic-formaldehyde resin.

To 95 parts of a p-phenylphenol-formaldehyde resin ("Bakelite XR-254") is added 5 parts of hexamethylene diisocyanate. After mixing thoroughly by grinding, a chip is molded at 180° C. and 6000 lbs./sq. in. pressure. The chip is clear and possesses a decreased solubility in xylene as compared to a similarly prepared chip of the original resin.

The above ("Bakelite XR-254") resin when modified with 5% of hexamethylene diisocyanate and 0.01% of cobalt catalyst, added as a solution of cobalt naphthenate, gives a molded chip which is insoluble in xylene, while a chip of the original resin is soluble.

Example III

This example illustrates the effect of a diisocyanate on a urea-formaldehyde resin prepared by heating one part of dimethylolurea and 2 parts of isobutanol in the presence of phthalic anhydride while continuously removing the water formed, and finally heating to a point just prior to gelation.

To 50 parts of a 50% solution of this urea-formaldehyde-isobutanol resin in dioxan and 70 parts of a 50% xylene solution of a 42% castor oil-modified glyceryl phthalate resin is added 5 parts of hexamethylene diisocyanate and 0.1 part benzoyl peroxide catalyst. A film is flowed and baked one hour at 127° C. The resulting film possesses improved toughness and hardness as compared to films of the above composition containing no diisocyanate, the effect being probably due to reaction with both components.

The urea-formaldehyde-isobutanol resin above can be modified using hexamethylene diisocyanate with or without the addition of a small amount of cobalt naphthenate catalyst to give colorless, hard films which have improved water resistance over unmodified films.

Example IV

This example illustrates the effect of a diisothiocyanate on a resinous phenolic-formaldehyde resin prepared by heating one mole of diphenylolpropane with 4 moles of formaldehyde in the presence of sodium hydroxide for 5 hours at 70° C.

To 95 parts of this resin dissolved in dry dioxan to give a 20% solution is added 5 parts of decamethylene diisothiocyanate. Flow-outs are baked one hour at 100° C. to yield insoluble films with improved water resistance. This insolubilizing effect is shown also by heating the dioxan solution, which results in the resin separating as an insoluble gel.

Example V

This example illustrates the effect of a diisocyanate on a phenol-formaldehyde resin prepared by heating equimolar amounts of phenol and formaldehyde in the presence of ammonium chloride and stopping the reaction when the mixture becomes cloudy, which requires about 3 hours at 90° C.

The viscous, sticky resin is treated with a low proportion of hexamethylene diisocyanate. After mixing thoroughly thin layers are allowed to stand at room temperature and at 100° C. overnight. The resulting modified films have improved set-up and are only slightly tacky. The modified phenol-formaldehyde resin also has improved adhesive power for laminating plywood. Films of the modified resin on steel plates have better set-up and water resistance than the original resin.

In the process of this invention the resin to be treated with the polyisocyanate or polyisothiocyanate may be any resinous condensation product of formaldehyde with a monomeric organic compound reactive therewith to form a resin, including phenols, amides (including ureas and sulfonamides), aldehydes, ketones, aromatic ethers, aromatic hydrocarbons, carbamates, and amines as discussed in Ellis—The Chemistry of Synthetic Resins—pp. 212, 263, 277-412, 540, 545-550, 557, 559, 564 et seq., 686 et seq., 712 et seq., 1007.

The original resin may contain variable portions of formaldehyde condensed with one or more monomeric materials and can be of low, medium, or high molecular weight. The invention is generic to the use of resinous condensation products arising from the use of formaldehyde or materials which are capable of yielding formaldehyde during the condensation such as paraformaldehyde, trioxan, methylal, etc. The invention thus includes the use of resinous condensation products of formaldehyde with phenol, o-hydroxybenzyl alcohol, o-cresol, m-cresol, p-cresol, p-phenylphenol, anisole, alpha-naphthol ethyl ether, beta-naphthol ethyl ether, diphenyl ether, alpha-naphthol, beta-naphthol, methyl or ethyl ether of 1,3,5-xylenol, xylenols, salicylic acid, o-methoxybenzoic acid, ethyl salicylate, phenoxyacetic acid, glycol monophenyl ether, diphenylolcyclohexane, diphenylolpropane, dithiophenylolpropane, thiophenol, thiocresol, monochlorophenol, catechol, resorcinol, pyrogallol, urea, guanidine, formamide, acetamide, monomethylolurea, acetylurea, phenylurea, methylurea, thiourea, o-, m-, and p-toluenesulfonamide, p-toluenesulfonethylamide, naphthalene, anthracene, phenanthrene, acenaphthene, chloronaphthalene, beta-naphthalenesulfonic acid, acetone, cyclohexanone, cyclopentanone, naphthalenesulfonamide, chlorobenzenesulfonamide, nitrobenzenesulfonamide, tetrahydronaphthalenesulfonamide, aniline, o-toluidine, alpha-naphthylamine, beta-naphthylamine, benzylaniline, urethane, adipamide, hexamethylene diurea, salicylaldehyde, and acetaldehyde. The resinous formaldehyde condensation products can be prepared by any of the methods known in the art, e. g., acid- or alkali-catalyzed condensation in the presence or absence of a solvent or diluent.

The invention is generic to the use of formaldehyde component resins such as the above-mentioned, treated or untreated, including compositions thereof with pigments, synthetic resins, drying oils, nylons, natural resins, plasticizers, driers, fillers, waxes, inhibitors, catalysts, solvents, and the like. It is sometimes desirable, in the case of the group of basic pigments such as zinc oxide, to treat the resin with the modifier first, preferably at elevated temperatures prior to the introduction of the pigment. Exemplary synthetic resins, of which some are also reactive with the polyisocyanates or isothiocyanates, are unmodified or oil-modified alkyd resins, pyroxylin, organic cellulose esters such as cellulose acetate, cellulose ethers such as ethyl cellulose, polyacrylates and polymethacrylates, polystyrene, polyvinyl esters such as polyvinyl acetate, polyvinyl chloride, polyvinyl alcohol, polyvinyl acetals and ketals, ester gum, hydrogenated phenol-formaldehyde resins, hydrogenated rosin, limed rosin, or leaded rosin, and phenolic resin modified rosin or ester gum. Examples of natural resins include rosin, copal, kauri, congo, manilla, damar, and shellac.

Some of the above are reactive with isocyanates such as alkyd resins, organic cellulose esters, drying oils, polyvinyl alcohol and acetals. See copending applications Serial No. 304,265, filed November 13, 1939, now Patent No. 2,282,827, and Serial No. 325,454, filed March 22, 1940. While some of the resins do not require plasticization, certain higher melting ones may be benefited for certain applications by the use of plasticizers such as lower melting triglyceride oils, alkyd resins, phthalate esters, phenols, mineral oils, and polyhydric alcohols.

Examples of fillers include wood flour, ground cork and mineral fillers such as mica, whiting and aluminum powders. In certain compositions, it is found an advantage to incorporate waxes such as carnauba wax, beeswax, paraffin wax, hydroxystearin, spermaceti wax and montan wax. When the resin composition is a varnish or enamel, it is sometimes advisable to add antiskinning, antisetting, or antigelling agents. Such inhibitors include pine oil, hydroquinone, guaiacol, creosole, and soya lecithin. In order to avoid the possibility of the polyisocyanate or polyisothiocyanate reacting with the solvent, it is advisable to use nonreactive solvents in these compositions such as aliphatic or aromatic hydrocarbons, esters, ketones, ethers, chlorinated hydrocarbons and nitroparaffins. In compositions where the modifier has been prereacted by warming with the resin, it is possible to employ any suitable solvent whether reactive or nonreactive.

In certain compositions it has been found desirable to add a small amount of an organic peroxide or metallic catalyst such as benzoyl peroxide, cobalt, manganese, lead, and iron naphthenates. Thus if the reaction requires too inconveniently long a time, benzoyl peroxide, or preferably cobalt, manganese, lead or iron naphthenate can be added to catalytically accerelate the rate of reaction.

The conditions of treating the resins of the present invention with modifiers can vary widely depending on the type of material involved and the effects desired. Although many of the effects desired can be secured at room temperatures, it is frequently advantageous to accelerate the effect through application of heat, the upper temperature limit being the decomposition temperature of the material involved. In working with solutions of the resinous formaldehyde condensation products and polyisocyanates or polyisothiocyanates, it is frequently necessary to formulate the mixtures just prior to use because of their tendency toward gelation. This instability is, of course, avoided by the use of a two-step process in which the resin is treated in situ with the modifier. This latter method of carrying out the modification is often preferred and can be effected by any suitable process such as by spraying, roller coating, dipping, tumbling, brushing, or rubbing. Best results are secured, with maximum economy, by using a solution of the modifier in a nonreactive solvent. In some cases it is desirable to reverse the above procedure, that is, the modifier is first applied to the substrate followed by an application of the resin.

When this invention is to be applied in the field of molding compositions, it is possible either to mix the resin and the modifier prior to molding or to prepare an unmodified molded article first, followed by treatment with the modifier. This latter treatment, which can be carried out by any suitable process such as dipping, spraying, tumbling, or brushing, produces moldings characterized by improved surface hardness and resistance to marring and solvents.

Another method of carrying out the process of this invention is to dissolve the resinous formaldehyde condensation product in a nonreactive solvent (see above for examples), add a low proportion of modifier, and heat the mixture briefly at an elevated temperature, i. e., 80–120° C., until the desired reaction has taken place. Care should be taken to use a proportion of modifier below that which causes gelation to take place. Products prepared in this way are characterized by improved water resistance and hardness in films, moldings, or adhesive compositions.

A preferred embodiment of the present invention is the treatment at 20–250° C. of a resinous condensation product involving formaldehyde as one component with 0.1–10% of an aliphatic diisocyanate. A still more preferred embodiment is the treatment at 20–180° C. of a phenol-formaldehyde resin with 0.1–10% of hexamethylene diisocyanate.

The optimum proportion of modifier also depends on the type of resin being treated and on the effect desired and should be determined for each new resin or composition. In many cases, moreover, it is not known accurately how much modifier actually is consumed. It can be said, however, that resins containing few groups capable of reacting with the modifier, such as a primary aliphatic amine-formaldehyde resin, require low proportions of diisocyanate or diisothiocyanate, in the order of 0.1–5%, while resins with higher proportion of reactive positions, such as a phenol-formaldehyde resin, often require 5–20% in order to secure the optimum results. The invention is not limited to these proportions, since in some special cases, lower than 0.1% or higher than 20% of the modifier yields the best results. Since the optimum proportion is easily determined by experiment, it is best to establish it for every new resin or resin composition.

The present invention is generic to the use of polyisocyanates and polyisothiocyanates in the treatment of resinous condensation products of formaldehyde. In addition to those shown in the examples there may be employed tetramethylene diisocyanate, 1,4-cyclohexandiol diisocyanate OCN—C₆H₁₀—NCO, para-isocyanatobenzyl isocyanate OCN—C₆H₄—CH₂—NCO, p-phenylene diisothiocyanate, 2,3-dimethyltetramethylene diisocyanate, p,p'diphenylene diisothiocyanate, 2-chlorotrimethylene diisocyanate, 5-nitro-1,3-phenylene diisocyanate, meta-isocyanatocinnamyl isocyanate

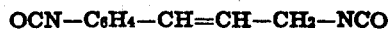

bis-2-isocyanatoethyl ether

the corresponding sulfide and 1,5-diisocyanato-3-pentanone,

1,2,4-butanetriol triisocyanate

phlorglucinol triisocyanate

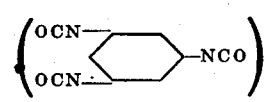

1,3,3-pentanetriol triisocyanate

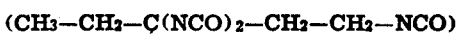

etc.

The diisocyanates and diisothiocyanates are particularly useful because of their greater availability and lower cost. The hydrocarbon and aliphatic diisocyanates and diisothiocyanates are preferred for similar reasons and particularly so the polymethylene compounds.

The products of this invention are useful as vehicles for improved air-drying or baking coating compositions and can be used to coat metal or wood directly or over a suitable base-coat and can also be used over glass, leather, stone, cloth, paper, rubber or cellulose. Certain ones of them are also useful as impregnating or adhesive compositions, binders for floor or wall coverings, plasticizers, and ingredients for moldings.

The process is useful in shortening the time necessary for curing certain resins. This improvement in thermal hardening results from the conversion of the thermoplastic resins into thermosetting resins due to cross-linking of the resin by the diisocyanate or diisothiocyanate modifier.

The above description and examples are intended to be illustrative only. Any modification of or variation therefrom which conforms to the spirit of the invention is intended to be included within the scope of the claims.

What is claimed is:

1. Process which comprises reacting a hydrocarbon diisocyanate with a resinous condensation product of formaldehyde with a monomeric organic compound reactive therewith to form a resin.

2. Process which comprises reacting a polymethylene diisocyanate with a resinous condensation product of formaldehyde with a monomeric organic compound reactive therewith to form a resin.

3. Process which comprises reacting hexamethylene diisocyanate with a resinous condensation product of formaldehyde with a monomeric organic compound reactive therewith to form a resin.

4. Process which comprises reacting, at 20–180° C. a phenol-formaldehyde resin with 0.1 to 10% of hexamethylene diisocyanate.

5. A resinous reaction product of a hydrocarbon diisocyanate and a resinous condensation product of formaldehyde with a monomeric organic compound reactive therewith to form a resin.

6. A resinous reaction product of a polymethylene diisocyanate and a resinous condensation product of formaldehyde with a monomeric organic compound reactive therewith to form a resin.

7. A resinous reaction product of hexamethylene diisocyanate and a resinous condensation product of formaldehyde with a monomeric organic compound reactive therewith to form a resin.

8. A resinous reaction product of a phenol-formaldehyde resin and 0.1 to 10% by weight of said resin, of hexamethylene diisocyanate.

9. Process which comprises maintaining a resinous condensation product of formaldehyde with a monomeric organic compound reactive therewith to form a resin in contact with an organic compound having a plurality of —NCA groups, wherein A is a chalcogen of atomic weight less than 33 until reaction occurs between the —NCA groups and the resinous condensation product.

10. Process which comprises maintaining a resinous condensation product of formaldehyde with a monomeric organic compound reactive therewith to form a resin in contact with an organic compound having two —NCA groups, wherein A is a chalcogen of atomic weight less than 33 until reaction occurs between the —NCA groups and the resinous condensation product.

11. Process which comprises maintaining a resinous condensation product of formaldehyde with a monomeric organic compound reactive therewith to form a resin in contact with an organic diisocyanate until reaction occurs between the isocyanate groups and the resinous condensation product.

12. A resinous condensation product of formaldehyde with a monomeric organic compound reactive therewith to form a resin, said condensation product being hardened by reaction with the —NCA groups of an organic compound having a plurality of said groups, A being a chalcogen of atomic weight less than 33.

13. A resinous condensation product of formaldehyde with a monomeric organic compound reactive therewith to form a resin, said condensation product being hardened by reaction with the —NCA groups of an organic compound having two of said groups, A being a chalcogen of atomic weight less than 33.

14. A resinous condensation product of formaldehyde with a monomeric organic compound reactive therewith to form a resin, said condensation product being hardened by reaction with the —NCO groups of an organic diisocyanate.

15. A resinous product of a phenol-formaldehyde condensation product and decamethylene diisothiocyanate.

16. A resinous reaction product of a urea-formaldehyde condensation product and hexamethylene diisocyanate.

17. A resinous reaction product of a phenol-formaldehyde condensation product and an organic compound which has but two reactive groups, which groups are —NCA groups, wherein A is a chalcogen of atomic weight less than 33.

18. Process which comprises maintaining a resinous condensation product of formaldehyde with a monomeric organic compound reactive therewith to form a resin in contact with an aliphatic diisocyanate until reaction occurs between the isocyanate groups and the resinous condensation product.

19. A resinous condensation product of formaldehyde with a monomeric organic compound reactive therewith to form a resin, said condensation product being hardened by reaction with the isocyanate groups of an aliphatic diisocyanate.

BURT CARLTON PRATT.

CERTIFICATE OF CORRECTION.

Patent No. 2,349,756.  May 23, 1944.

BURT CARLTON PRATT.

It is hereby certified that error appears in the printed specification of the above numbered patent requiring correction as follows: Page 2, first column, line 11, Example III, for "formaldehydeisobutanol" read --formaldehyde-isobutanol--; page 4, second column, line 35, claim 15, after the word "resinous" insert --reaction--; and that the said Letters Patent should be read with this correction therein that the same may conform to the record of the case in the Patent Office.

Signed and sealed this 15th day of August, A. D. 1944.

Leslie Frazer (Seal)  Acting Commissioner of Patents.